United States Patent [19]
Pfeiffer

[11] 3,875,646
[45] Apr. 8, 1975

[54] DIFFERENTIAL TEST ASSEMBLY AND METHOD OF ASSEMBLING A DIFFERENTIAL

[76] Inventor: Richard D. Pfeiffer, 410 102nd St., No. 24, Bellevue, Wash. 98004

[22] Filed: Mar. 6, 1974

[21] Appl. No.: 448,526

Related U.S. Application Data
[62] Division of Ser. No. 134,987, April 19, 1971.

[52] U.S. Cl................ 29/407; 29/434; 33/181 AT; 33/180 R; 33/178 B; 74/606 R
[51] Int. Cl............................................ B23q 17/00
[58] Field of Search ............ 29/407, 428, 434, 469; 33/178 B, 174 G, 174 H, 180 R, 180 AT, 181 AT, 181 R; 74/606 R

[56] References Cited
UNITED STATES PATENTS

| | | | |
|---|---|---|---|
| 1,598,599 | 9/1926 | Buckwalter | 29/407 X |
| 2,402,142 | 6/1946 | Anderer | 33/178 B |
| 2,576,377 | 11/1951 | Wochos et al. | 33/178 B |
| 3,308,546 | 3/1967 | Storch | 29/407 X |

FOREIGN PATENTS OR APPLICATIONS

| | | | |
|---|---|---|---|
| 486,734 | 6/1938 | United Kingdom | 33/178 B |
| 596,103 | 12/1947 | United Kingdom | 33/178 B |
| 1,043,762 | 11/1958 | Germany | 33/178 B |

*Primary Examiner*—C. W. Lanham
*Assistant Examiner*—Victor A. DiPalma

[57] ABSTRACT

This disclosure is for a jig measuring tool and the method of using the jig measuring tool. The jig measuring tool is of use in aligning gears in a differential, a transmission and final drives in small and large machinery such as small trucks, wheel-type vehicles, crawler vehicles, and industrial material handling machinery and the like. The jig measuring tool makes it possible to save time, save material and to align the gears with greater accuracy in repairing such machinery than with previously available apparatus. Further, it makes it possible for the small repair shops to economically and accurately repair such machinery.

10 Claims, 20 Drawing Figures

DIFFERENTIAL TEST ASSEMBLY AND METHOD OF ASSEMBLING A DIFFERENTIAL

This application is a divisional application of my co-pending patent application Ser. No. 134,987, filing date of Apr. 19, 1971.

Many pieces of equipment, having a differential, transmission or final drive, need repairing as the gears may become worn or the gears may break or the bearings may become worn and need to be replaced. An example, and one with which I am familiar as I have repaired many of these units, is the differentials on various half-ton and three-quarter-ton trucks. These half-ton and three-quarter-ton trucks use a Spicer 44 or a Spicer 45 or a Spicer 60 differential. Also, certain military vehicles use a Spicer 35. These differentials are manufactured by the Spicer Division of the Dana Corporation, Fort Wayne, Indiana and Toledo, Ohio. In the repairing or overhauling of such differentials, the rear axles were removed, the universal joint leading into the differential was disconnected, and the differential and housing were taken off of the vehicle. Then, the differential and housing were placed on a workstand. If necessary, the housing was spread, due to preloaded bearings, so as to make it possible to remove the differential assembly. The differential assembly was disassembled by removing the bearings, shims and ring gear from the ring gear mounting flange. To examine the pinion gear, bearings, and shims were removed from the housing.

Then, new bearings were pressed on to each end of the differential case, without shims and without ring gear, and the differential case and bearings were positioned in the housing so as to determine the free basic dimension. This free basic dimension was, and may be taken, with a dial indicator. As the differential case bearing assemblies are of the tapered roller type this free basic dimension is essentially an approximation of the non-preloaded differential test assembly.

The pinion gear was installed in the housing. The depth of the pinion gear in the housing could be determined by a pinion depth gauge. However, most repair shops did not have and do not have, a pinion depth gauge and therefore the depth of the pinion gear in the housing was an approximation.

The differential case assembly with the bearings on each end was removed from the housing and the ring gear was mounted on the ring gear mounting flange or the differential case mounting flange. Then, the differential case assembly with the ring gear and the bearings was installed, again, in the housing. By means of the dial indicator the position of the ring gear, with respect to the pinion gear, was approximated as to correct backlash. The ring gear was moved away from the pinion gear and the dial indicator reading of this movement was taken to give the thickness of shims to be positioned on the gear side of the differential case, i.e., the gear side of the differential case being that side of the case on which was mounted the ring gear. This was a non-preloaded dimension. The thickness of shims on the gear side of the differential case was subtracted from the free basic dimension shim pack to give the thickness of shims on the off-gear side of the differential case, i.e., that side of the differential case away from the differential case mounting flange on the ring gear.

The bearings, which were and are a pressed fit on the differential case, were removed by a bearing puller. The necessary thickness of shims, in the inboard shim method, were installed on the differential case plus 0.008 inches of shims on each side of the differential case. This provided specified preload. Then, the bearings were again pressed onto the hubs of the differential case.

At this stage the housing was spread by means of a special tool, and the differential case assembly was once again positioned in the housing. The housing was spread to accommodate the preloaded condition of the differential case assembly with the bearings and shims on the differential case assembly. With the bearings and shims on the differential case assembly, the differential case assembly was wider than the opening leading into the housing and it was necessary to spread the housing. In the spreading of the housing a dial indicator was mounted in such a manner so as to indicate the spread. The maximum allowable spread is 0.020 inches. If the spread is greater than 0.020 inches the housing may be permanently distorted. After the differential case assembly was installed in the housing the spreader tool was relaxed or removed and bearing caps installed.

At this stage the run out of the ring gear was checked with a dial indicator. If the run out was in excess of 0.002 inches, maximum, it was necessary to remove the differential case assembly from the housing. And, the ring gear was removed from the differential case assembly. Then, the differential case assembly was installed in the housing and the ring gear mounting flange of the differential case was checked with a dial indicator to determine if the differential case was worn or defective. If a new differential case had to be installed, then the free basic dimension again had to be determined because of manufacturing tolerances and the variation in dimensions from one differential case to another differential case.

The reader is reminded that every time the differential case assembly is installed in and removed from the housing, the housing must be spread.

At this stage, the backlash between the pinion gear and the ring gear was checked to see if there was the specified amount of backlash.

If the backlash between the ring gear and the pinion gear was incorrect then the differential case assembly was removed from the housing. The pressed-on bearings were removed with a puller. In removing the pressed on bearings with the puller the shims were damaged and it was necessary to replace the shims. In one repair installation, I had to use one hundred and twenty new shims of various thicknesses. New shims were positioned on the differential case assembly and the bearings were again pressed onto the differential case assembly. The differential case assembly with shims and pressed-on bearings was again positioned in the housing and the backlash between the ring gear and the pinion gear determined. This procedure was repeated until the correct and specified backlash was obtained between the ring gear and the pinion gear. Many times it was necessary to repeat the steps of removing the differential case assembly, taking off the bearings with the puller and installing new shims and again pressing on the bearings.

When the correct backlash between the ring gear and pinion gear was obtained then the correct depth of the pinion gear was determined. To do this the ring gear teeth were and are painted with a white lead or a red lead and the ring gear and pinion gear were and are rotated to determine the tooth contact pattern between the ring gear and the pinion gear. If the pattern was incorrect, then the pinion gear, shims, and bearings were removed from the housing. However, before the pinion gear could be removed from the housing it was necessary to remove the differential case assembly comprising the ring gear, shims and bearings from the housing. Then, the pinion gear assembly was removed and the necessary corrections made with respect to the thickness of shims in the inner pinion gear bearing bore.

The pinion gear assembly was installed, once again in the housing. At this stage, it must be remembered, that the backlash between the ring gear and the pinion gear had been changed because the thickness of shims on the pinion gear assembly had been changed and the depth of the pinion gear in the housing had been changed. Therefore, it was necessary, once again, to determine the correct and specified backlash between the ring gear and the pinion gear.

Briefly, any change in pinion depth to correct gear tooth contact pattern resulted in a change in the ring gear and the pinion gear backlash. In order to return the ring gear and the pinion gear to the specified backlash it was again necessary to remove the bearings from the differential case assembly comprising the ring gear, shims, and bearings. In so removing the bearings a number of shims were again destroyed. Further, the bearings again had to be pressed onto the differential case. Then, it was necessary again to determine the gear tooth contact pattern between the ring gear and the pinion gear. If the gear tooth contact pattern was not satisfactory, the entire procedure had to be repeated until a satisfactory gear tooth contact pattern was secured. Sometimes, the differential case assembly bearings had to be removed and replaced five or six times and, it is to be remembered, that each time the differential case assembly bearings were removed and replaced it was necessary to use new shims as the shims on the differential case assembly were damaged or deformed by pulling the bearings off of the differential case assembly. This was not all. Unfortunately, every once in a while, a bearing was damaged in removing the bearing from the differential case assembly. It will be found, due to manufacturing tolerances, that the thickness of the new bearing may be different from the thickness of the damaged bearing. With this difference in thickness there was necessitated a difference in the thickness of shims. This meant that the procedure had to be, virtually, started from the beginning and the entire procedure repeated until the proper backlash and gear tooth contact pattern was secured between the ring gear and the pinion gear.

From the foregoing, it is seen that the repairing of a differential of this type was an approximation until the correct gear tooth contact pattern was secured between the ring gear and the pinion gear. One of the contributing factors to this approximation is the fact that with this procedure it is not possible to secure a correct determination of the preload of the differential case assembly. With this method the preload condition is, usually, an approximation.

The repair manual allows 7.7 hours to overhaul the differential according to this procedure. Of this time, 2.5 hours are allowed for removing and replacing the differential or rear end from the vehicle. Further, of this 7.7 hours, there are allowed 5.2 hours for overhauling the differential or rear end. Sometimes, it is possible to overhaul the differential in 5.2 hours and sometimes due to difficulties in approximating the correct gear tooth contact pattern between the ring gear and the pinion gear and difficulties in pulling the bearings from the differential case assembly there is required as long as eight hours for overhauling the differential. Actually, when a party starts to overhaul the differential it is not known if the differential can be overhauled in the specified 5.2 hours or if a greater period of time will be required.

Because of the uncertainty of the method of measuring there is the possibility, when overhaul is completed, that there may be an excessive or insufficient preload on the differential case assembly bearings. This excessive or insufficient preload will result in premature failure of these bearings and possible damage to the housing. From experience, in a majority of those instances where there is insufficient preload there is damage to the housing and the housing must be replaced. A new differential housing is expensive.

As contrasted with the preceding procedure there is briefly outlined the procedure for repairing a differential using my jig measuring tools and which procedure makes possible to more satisfactorily preload the differential case assembly bearings.

The housing is spread, either in the vehicle or removed from the vehicle, and the differential case assembly removed, and, also, the pinion gear assembly removed. The pinion gear assembly is disassembled and the differential case assembly is disassembled. All parts are cleaned and examined. The condition of the gears is determined. Then, after determining the pinion gear depth the pinion gear assembly is reinstalled. The differential case assembly, without the ring gear mounted on the ring gear mounting flange, and with jig measuring tools on the differential case assembly, remember, there are no bearing assemblies on the differential case assembly at this stage, the differential case assembly is installed in the differential housing to determine the thickness of shims required. By way of re-capitulation, after the differential case assembly has been removed from the housing, the spreader tension is relieved so as to allow the housing to be relaxed to resume its normal shape. Now, the differential case assembly, without the ring gear and with the jig measuring tools installed on the hubs of the differential cases can be inserted into the housing without spreading the housing. The reason for this is that there are no shims on the differential case assembly at this stage. After adjusting the jig measuring tools to eliminate all side-to-side motion while maintaining rotatable clearance the run out of the differential case is checked. The checking of the run out of the differential case at this stage of the overhaul may save considerable time as contrasted with prior procedures. After the run out has been checked the differential case assembly is removed from the housing, the ring gear installed, and the differential case assembly with the ring gear is reinstalled into the housing. It may be necessary to readjust the jig measuring tools in order to properly position the ring gear. The backlash is determined and the gear tooth contact pattern between the ring gear and the pinion gear is obtained. The differential case assembly with the ring gear is removed from the housing, and the bearings and shims, plus the thickness of shims required for preload condition as determined from the measurements of the jig measuring tools and bearings, are installed on the differential case assembly. The reader's attention is called to the fact that this is the only time that bearings need be positioned on the differential case assembly. The housing is spread and the differential case assembly is installed in the housing. The bearing caps can be installed and the housing sealed. This, is the general procedure with the use of my subject invention, i.e., the jig measuring tool.

From having overhauled differentials and other pieces of machinery having gears, it is an object of this invention to provide the jig measuring tool so that less labor is required for setting up gears than required with previously available apparatus and methods; to provide a method using less labor than previous methods have provided, to provide a jig measuring tool requiring less time to align gears than prior methods; to provide a jig measuring tool whereby greater accuracy is realized in measurements for aligning gears; to provide a jig measuring tool making it less expensive to overhaul differentials and gear type machinery; to provide a jig measuring tool whereby there is no damage to shims and bearings in overhauling a differential and gear type machinery; to provide a method whereby there is no damage to shims and bearings in overhauling a differential and gear type machinery as contrasted with prior methods wherein there was damage; to provide a method and apparatus for more satisfactorily preloading the differential; to provide a jig measuring tool and a method which makes it possible to have a preview of the entire overhaul of the differential before bearings and shims are placed on the differential case assembly; to provide a method and apparatus for determining the run out of a differential case previous to final assembly; and, to provide a jig measuring tool which makes it possible to have better gear tooth contact between the gears in a differential and in gear type machinery.

These and other important objects and advantages of the invention will be more particularly brought forth upon reference to the accompanying drawings, the detailed description of the invention and the appended claims.

In FIGS. 1–13 there is illustrated four jig measuring tools.

Figures 1, 2:
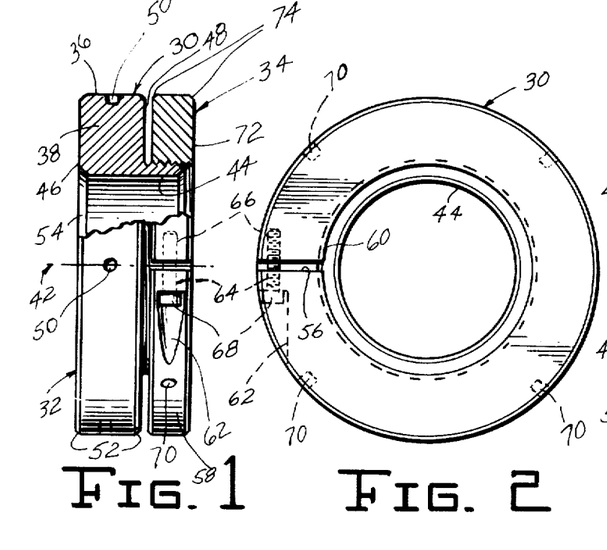
FIG. 1 is a fragmentary, partial side elevational view and partial vertical cross-sectional view, of a specific embodiment of a jig measuring tool and shows the stationary member and the movable member mounted on said stationary member.
FIG. 2 is an end elevational view of the jig measuring tool of FIG. 1 and illustrates a movable member mounted on the stationary member.
Figure 3:
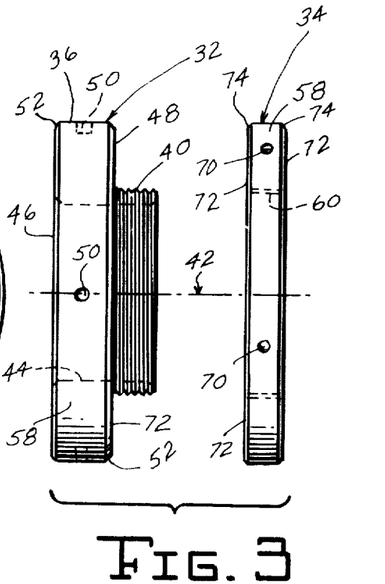
FIG. 3 is an exploded side elevational view illustrating the stationary member and the movable member.

In FIGS. 1–3 there is illustrated a first jig measuring tool 30. The tool 30 comprises a stationary member 32 and a movable member 34. The stationary member 32 has an outside surface 36 of a diametrical dimension which is substantially the same as, but slightly less than, the interior diametrical dimension of a bearing bore and in which bore said stationary member 32 will be positioned. The stationary member 32 has a circular body portion 38 and on one side a circular shoulder 40 which is externally threaded. The stationary member 32 and the movable member 34 have a center line 42 and which center line is a center line of the outside diametrical dimension for the stationary member 32 and the movable member 34. This center line will substantially coincide with the center line of said bearing bore when said jig measuring tool is positioned in said bearing bore. The center line also substantially coincides with the center line of the differential case. The stationary member 32 has a central bore 44. The center line of the jig measuring tool is also the center line of the central bore 44. The interior diametrical dimension of the central bore is slightly larger than the exterior diametrical dimension of a first bearing surface on which the jig measuring tool will be positioned. The first bearing surface being the differential case hubs on which the jig measuring tool will be positioned. This provides a rotatable clearance between the jig measuring tool and the first bearing surface. The stationary member 32 has a first exterior surface 46 and a second exterior surface 48. The exterior surface 48 is positioned adjacent to the exterior threaded circular shoulder 40. In the exterior surface 36 there are a number of holes 50. The stationary member 32 is chamfered at 52 at the junction of the surface 36 with the side 46 and also at the junction of the surface 36 with the side 48. Also, the entrance to the central bore is chamfered at 54, both ends of the central bore.

The movable member 34 is essentially a split ring having a parting line or surface 56 from the outer diametrical surface 58 to the internally threaded bore 60. On one side of the parting line 56 there is a recess 62 and a passageway 64. On the other side of the parting line 56 there is a drilled and threaded hole 66. A setscrew 68 is positioned in the recess 62, the passageway 64 and the drilled and threaded hole 66. Also, on the exterior diametrical surface 58 there are a number of holes 70 for receiving a tool so as to rotate the movable member 34 on the threaded circular shoulder 40 of the stationary member 32. The holes 50 on the stationary member 32 make it possible to prevent rotation of the stationary member 32 while rotating the movable member 34 thereon.

It is seen that the setscrew 68 may be loosened, the rotatable member 34 rotated on the exterior threaded circular shoulder 40 to a desired position, and then the setscrew 68 turned so as to tightly and firmly position the movable member 34 with respect to the stationary member 32.

The movable member 34 has sides 72. Also, the movable member 34 is chamfered at 74 at the junction of the diametrical surface 34 and the sides 72.

The exterior diametrical dimension of the movable member 34 may be substantially the same as the exterior diametrical dimension of the stationary member 32 or may be slightly less than the exterior diametrical dimension of the stationary member 32.

Figure 4:
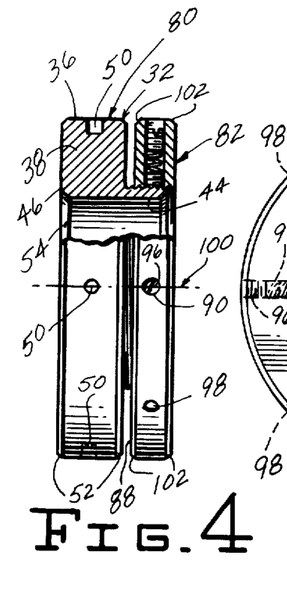
FIg. 4 is a partial side elevational view and a partial vertical cross-sectional view of another embodiment of the jig measuring tool and illustrates the stationary member and the movable member mounted on said stationary member.
Figures 5, 6:
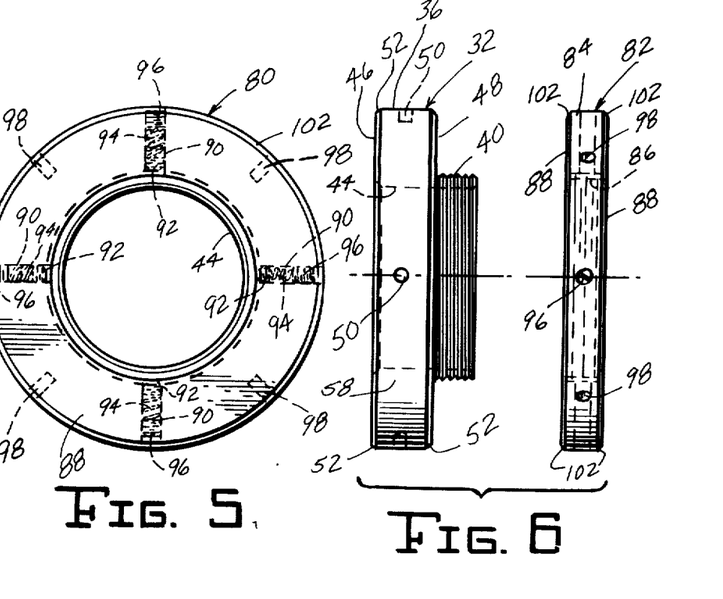
FIG. 5 is an end elevational view of said jig measuring tool of FIG. 4 and illustrates the movable member mounted on said stationary member.
FIG. 6 is an exploded view of the jig measuring tool of FIG. 4 and illustrates the stationary member and the movable member.

In FIGS. 4, 5, and 6, there is illustrated a second jig measuring tool 80. This jig measuring tool 80 comprises a stationary member 32, which has previously been described, and a movable member 82. The movable member 82 is of a generally ring-like configuration and has an exterior diametrical surface 84, a central bore 86, and sides 88. In the exterior diametrical surface 84 there are four drilled and threaded passageways 90 extending from the exterior diametrical surface 84, through the body of the movable member 82, and to the internally threaded bore 86. There is positioned in each drilled and tapped passageway 90 a positioning means comprising a plug 92, a spring 94 and a setscrew 96. This is a frictional lock. The frictional lock is controlled by the adjustment of said setscrews 96. In the exterior diametrical surface 84 there are a plurality of drilled holes 98. It is possible to place a tool in a hole 98 so as to rotate the movable member 82 on the externally threaded circular shoulder 40. The dimension of the exterior diametrical surface 84 may be substantially the same as the dimension of the exterior diametrical surface 36 of the movable member 32 or maybe slightly less than the dimension of the exterior diametrical surface 36 of the movable member 32. The jig measuring tool 80 has a center line 100. The center line 100 of the jig measuring tool is also the center line of the central bore 44. The interior diametrical dimension of the central bore is slightly larger than the exterior diametrical dimension of a first bearing surface on which the block will be positioned, and which first bearing surface is the hub of the differential case. This provides a rotatable clearance between the jig measuring tool and the first bearing surface. The movable member 82 is chamfered at 102, the junction of the outside diametrical dimension 84 and the sides 88.

Figure 7:
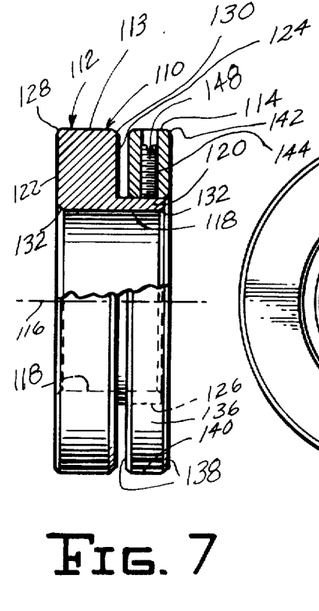
FIG. 7 is a partial side elevational view and a partial vertical cross-sectional view of another jig measuring tool and illustrates the stationary member and the movable member mounted on said stationary member.
Figures 8, 9:
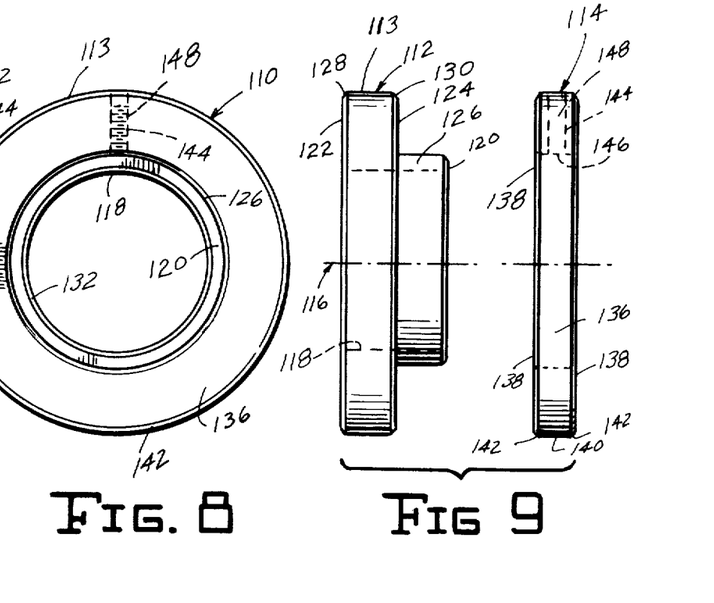
FIG. 8 is an end elevational view of said jig measuring tool of FIG. 7 and illustrates the movable member mounted on said stationary member.
FIG. 9 is an exploded view of the jig measuring tool of FIG. 7 and illustrates the stationary member and the movable member.

In FIGS. 7, 8 and 9 there is illustrated a third jig measuring tool 110. The jig measuring tool 110 comprises a stationary member 112 and a movable member 114. The stationary member 112 has an outside surface 113 of a diametrical dimension which is substantially the same as, but slightly less than, the interior diametrical dimension of a bearing bore and in which bore said jig measuring tool will be positioned. Further, said jig measuring tool has a center line 116 and which center line is a center line of said outside diametrical dimension of the stationary member 112. The center line 116 will substantially coincide with the center line of said bearing bore when said jig measuring tool is positioned in said bearing bore. The stationary member 112 has a central bore 118. The center line of the jig measuring tool is also substantially the center line of the central bore 118. The interior diametrical dimension of the central bore 118 is slightly larger than the exterior diametrical dimension of a first bearing surface on which said jig measuring tool will be positioned. This first bearing surface may be the hubs of a differential case. This provides a rotatable clearance between the jig measuring tool and the first bearing surface. The stationary member 112 has a circular shoulder 120. Also, the stationary member 112 has a first exterior surface 122 and a second exterior surface 124. The second exterior surface 124 is adjacent to the circular shoulder 120. The circular shoulder 120 has a smooth exterior surface 126. The stationary member 112 is chamfered at 128, the junction of the surface 113 and the side 122. Also, the stationary member 112 is chamfered at 130, the junction of the surface 113 and the side 124. Further, the central bore 118 is chamfered at 132, on both ends of the central bore.

The movable member 114 has a generally ring-like or annular configuration and has a body 136, also, 114 has sides 138 and an exterior diametrical surface 140. The movable member 114 is chamfered at 142, the junction of the side 138 and the exterior diametrical dimension 140. In the body 136 there is a drilled and tapped passageway 144 extending from the exterior diametrical dimension 140 to the central bore 146. In the drilled and tapped passageway 144 there is a setscrew 148 for firmly positioning the movable member 114 onto the circular shoulder 120 of the stationary member 112. The bore 146 is of a slightly greater interior diameter than the exterior diameter of the circular shoulder 120. Also, the center line 116 of the bore 146 is substantially the center line of the movable member 114 and also of the exterior diametrical surface 140. This makes it possible for the movable member 114 to slip onto and move on the circular shoulder 120.

In FIGS. 10, 11, 12 and 13 there is illustrated a jig measuring tool 150. This tool comprises a stationary member 152 and a movable member 154.

Figures 12, 13, 19:
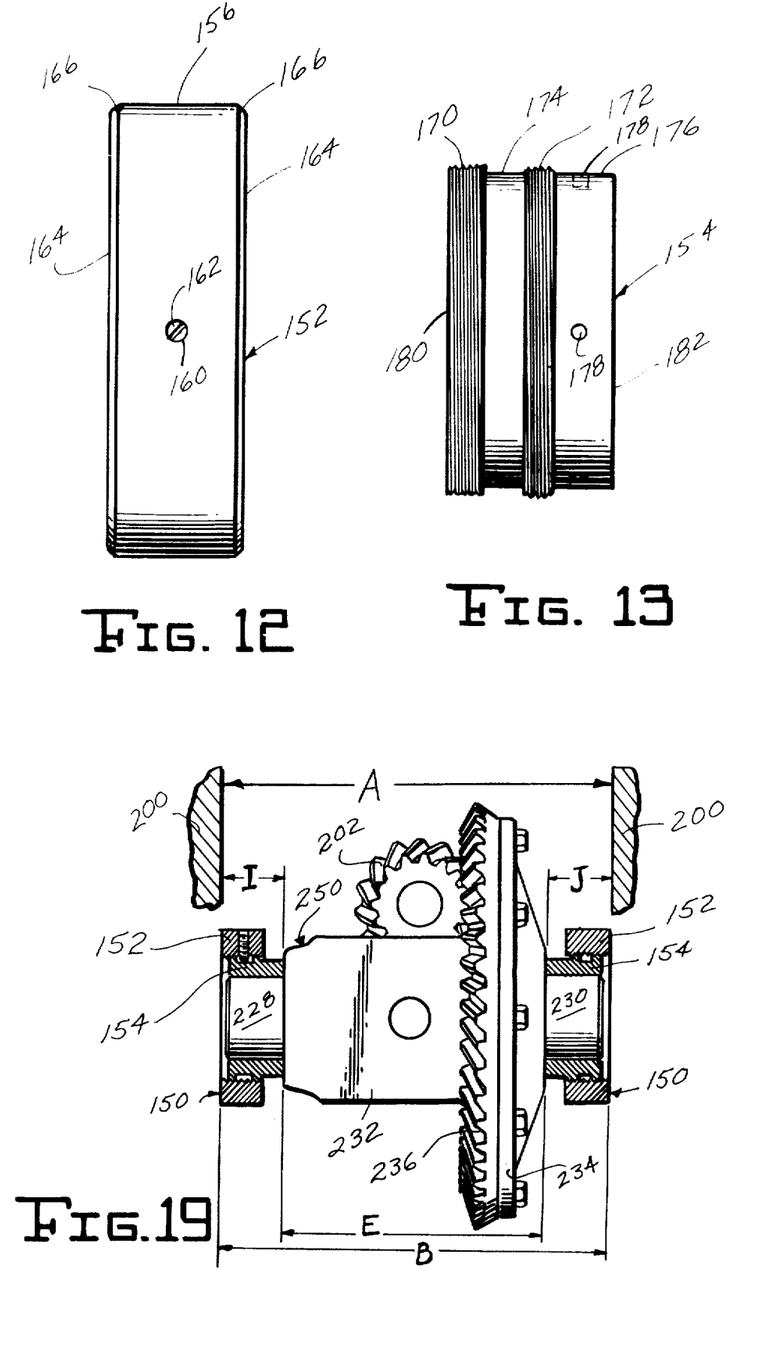
FIG. 12 is a side elevational view of the outer stationary member.
FIG. 13 is a side elevational view of the inner movable member.
FIG. 19 is a fragmentary, partial cross-sectional view of the differential case test assembly, different embodiments of the jig measuring tools and illustrating some of the basic dimensions of the differential case test assembly and the differential housing; and, FIG. 20 is a view if the differential housing and looking into the interior of the housing and illustrates the pinion gear, the differential case test assembly positioned in jig measuring tools in the differential housing, and illustrates, in phantom, a spreader tool for spreading the differential housing so as to make the opening into the differential housing larger in order to accommodate a preloaded differential case assembly.

In the side elevational view, the stationary member 152 has the appearance of a torus. Also, in a side elevational view, the movable member 154 has the appearance of a torus.

Figure 10:
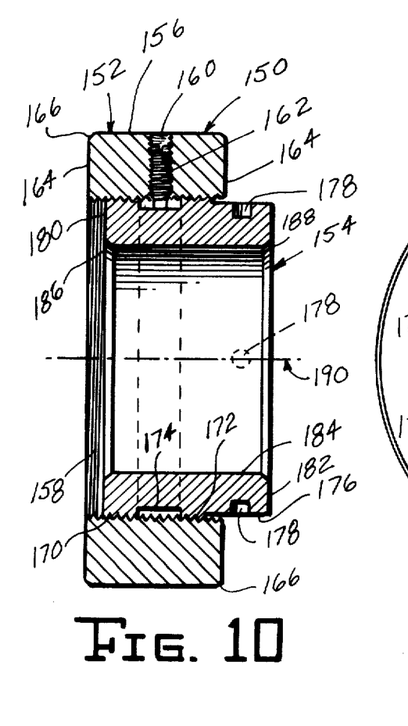
FIG. 10 is a vertical longitudinal cross-sectional view of another specific embodiment of a jig measuring tool and illustrates an outer stationary member and an inner movable member mounted in said outer stationary member.
Figure 11:
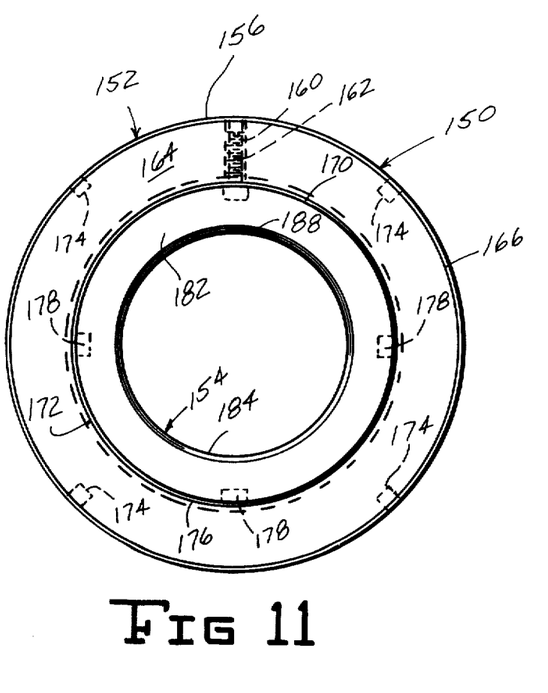
FIG. 11 is an end elevational view of said jig measuring tool of FIG. 10 and illustrates said inner movable member mounted in said outer stationary member.

The stationary member 152 is of a generally cylindrical configuration and has a smooth exterior surface 156 and a threaded central passageway 158.

There is a tapped drilled hole 160 extending from the surface 156 to the threaded passageway 158. In the tapped drilled hole 160, there is positioned a setscrew 162.

The stationary member 152 has sides 164. At the junction of the sides 164 and the exterior surface 156 there is a chamfered edge 166.

The movable member 154 has a first externally threaded surface 170 and a second externally threaded surface 172. Between the threaded surfaces 170 and 172 there is a recessed smooth surface 174. The recessed smooth surface 174 is of a lesser external diameter than the external diameters of the threaded surfaces 170 and 172.

The movable member 154 has a further external surface 176. The surface 176 is of a lesser external diameter than the external diameter of the threaded surface 172.

In the external surface 176, and at, approximately, 90° intervals there are four recesses 178.

The movable member 154 has a first side 180, adjacent to the externally threaded surface 170, and a second side 182, adjacent to the external surface 176.

The movable member 154 has a smooth central passageway 184. At the junction of the side 180 and the passageway 184 there is a chamfered edge 186. At the junction of the side 182 and the passageway 184 there is a chamfered edge 188. In FIGS. 10 and 13 it is seen that the externally recessed surface 174 is positioned between the externally threaded surfaces 170 and 172. The width of the externally recessed surface 174 is sufficient to allow the movable member 154 to be partially screwed into and out of the stationary member 152.

Also, it is seen that is is possible for the setscrew 162 to be screwed into the drilled tapped hole 160 so as to firmly position the movable member 154 and the stationary member 152 with respect to each other.

The stationary member 152 has the outside surface 156 of a diametrical dimension which is substantially the same as, but slightly less than, the interior diametrical dimension of a bearing bore and in which said bore said stationary member 152 will be positioned. It is to be remembered that the movable member 154 will be positioned in the stationary member 152.

The stationary member 152 has a center line 190 and which center line is a center line of said outside diametrical dimension of the surface 156. This center line 190 will substantially coincide with the center line of said bearing bore when said stationary member 152 is positioned in said bearing bore. Again, the stationary member 152 has a threaded passageway 158. The center line of the stationary member 152 is also the center line of the threaded passageway 158. The movable member 154 has an exterior diametrical dimension of the exteriorally threaded surfaces 170 and 172. The movable member 154 has a center line which, when the movable member 154 is positioned in the stationary member 152, coincides with the center line 190, and will be referred to by reference numeral 190. The movable member 154 has an interior surface 184, and which is the interior diametrical dimension of this interior surface 184 or passageway 184. The center line of the interior passageway 184 is the center line 190. The interior diametrical dimension of the passageway or central bore 184 is slightly larger than the exterior diametrical dimension of a first bearing surface on which the movable member 154 will be positioned. This provides a rotatable clearance between the jig measuring tool 150, or the movable member 154 and the first bearing surface. The jig measuring tool 150 is of a variable width, depending upon the position of the movable member 154 with respect to the stationary member 152, and which variable width will be substantially equal to the width of a bearing assembly plus the necessary shims and for which said bearing assembly and said shims said jig measuring tool 150 will be temporarily substituted in said bearing bore and on said bearing surface.

The drilled holes 178 in the movable member 154 are for receiving a tool so that the movable member may be moved or adjusted with respect to the stationary member 152.

Figure 14:
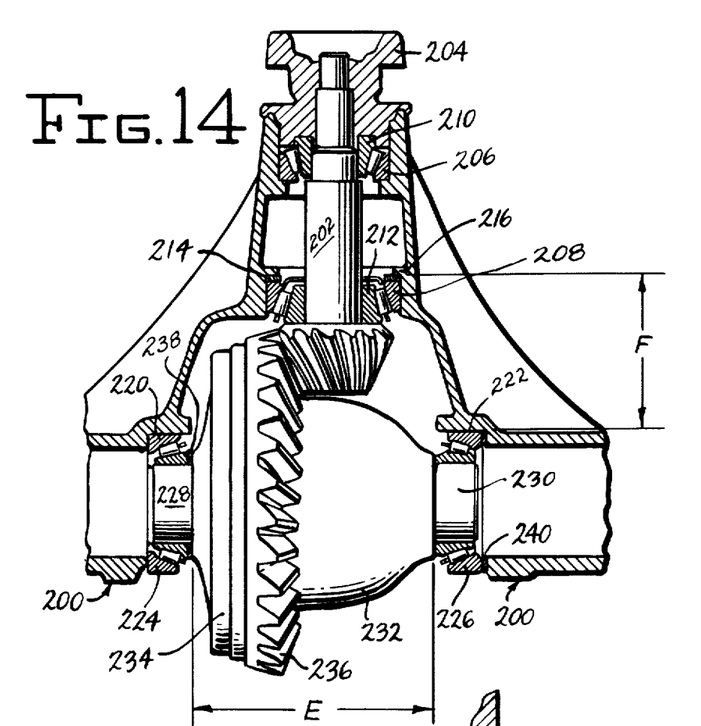
FIG. 14 is a fragmentary, partial cross-sectional view of a differential and illustrates the pinion gear assembly, the differential case assembly, and two methods for adjusting the differential case assembly, one by the inboard shims, on the left of the differential case assembly, the other by the outboard shims, on the right of the differential case assembly and the differential housing.
Figure 15:
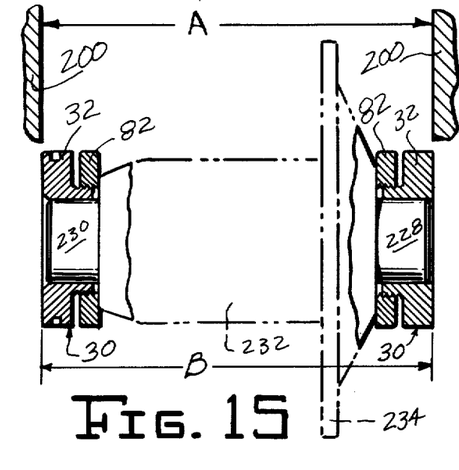
FIG. 15 is a fragmentary, partially in longitudinal vertical cross-section, of a differential case with the jig measuring tool of FIGS. 1, 2, and 3 on the left, and with the jig measuring tool of FIGS. 4, 5, and 6 on the right.
Figure 16:
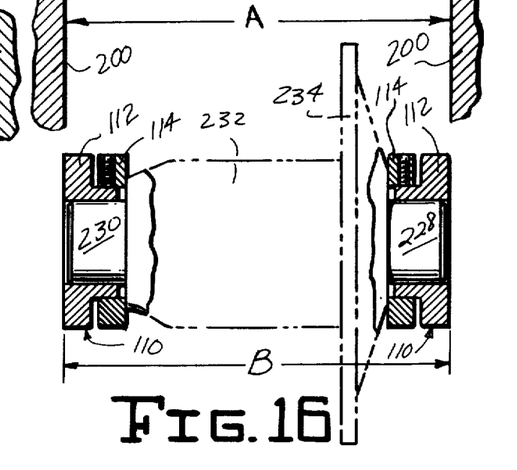
FIG. 16 is a fragmentary longitudinal vertical cross-sectional view of a differential case and with the jig measuring tools of FIGS. 7, 8, and 9.

In FIG. 14 there is a fragmentary cross-sectional view of a differential housing 200 having an integral pinion gear and shaft 202. On the outer end of the pinion gear shaft 202 there is a pinion gear yoke 204.

In the housing 200 there are spaced-apart bearing bores 206 and 208 for receiving an outer bearing 210 for the pinion gear 202 and an inner bearing 212 for the pinion gear 202. In FIG. 14 it is seen that there are shims 214 between a circular shoulder 216 and the bearing 208 so as to position the bearing 212 and the pinion gear 202 in the bearing bore 208. The function of the shims 214 will be more particularly described in a later part of the specification.

Also, in the housing 200, it is seen that there are two spaced apart differential case bearing bores 220 and 222. The bearing bore 220 is on the gear side of the differential case and the bearing bore 222 is on the off gear side of the differential case. In the bearing bore 220 there is a bearing 224 and in the bearing bore 222 there is a bearing 226. The bearings 224 and 226 are pressed onto the hubs 228 and 230 of the differential case 232. The hub 228 is on the gear side of the differential case and the hub 230 is on the off gear side of the differential case. The differential case has a ring gear mounting flange 234. On the ring gear mounting flange 234 there is mounted a ring gear 236 and which ring gear 236 is secured by bolts to the ring gear mounting flange 234.

With reference to FIG. 14 the reader is to realize that this is a schematic illustration of a differential having both an inboard shim 238 and an outboard shim 240. In a differential, the differential will have either an inboard shim or an outboard shim but will not have the combination of an inboard shim 238 and an outboard shim 240 as illustrated in FIG. 14. Again, FIG. 14 is a schematic illustration to show that a differential may have inboard shims as illustrated by reference numeral 238 or may have outboard shims as illustrated by reference numeral 240.

In FIG. 19 A represents the normal opening in the differential housing 200. This opening is a variable dimension due to manufacturing tolerances. Normally, in assembling a differential case assembly, with inboard shims, the dimension of the differential case assembly is larger than the dimension of the opening A. Therefore, a spreader tool 201 is required to enlarge the opening A by approximately 0.020 inches. It is advisable to not spread the opening A by more than 0.020 inches in order to avoid permanent distortion of the differential housing 200. The use of a spreader tool 201 to enlarge the opening A is normal and has been used for many years.

The dimension B is the overall length of the differential case test assembly with the jig measuring tools positioned and adjusted on the hubs. The dimension B is approximately equal to but slightly less than the dimension A so as to provide rotatable clearance between the differential case test assembly and the jig measuring tools.

The dimensions I and J are variable in order to place the ring gear 236 in its proper position relative to the pinion gear 202 to obtain specified backlash between the ring gear 236 and the pinion gear 202. The dimension I is the off-gear side dimension between the differential case and the shoulder of the bearing bore 222 of the differential housing. The dimension J is the gear side dimension between the differential case and the shoulder of the bearing bore 220 of the differential housing.

The dimension E is the overall length of the differential case, less hubs, and is a variable due to the manufacturing tolerances.

Because of the variations in the manufacturing tolerances of the dimension A, the dimension B, the dimension E, see FIG. 19, and the variation in the thickness of the bearing assemblies 228 and 230, see FIG. 14, it is necessary to use shims of various thicknesses in order to obtain specified backlash between the ring gear and the pinion gear and also to obtain necessary preload of the differential case assembly.

The jig measuring tool, 30, 80, 110 or 150 is adjustable in thickness because of the two relatively movable members. The reason for the adjustability, with respect to thickness, is to determine the dimensions I and J. From these dimensions it is possible to figure the proper adjustment of the differential. Further, from these dimensions it is possible to figure the correct thickness of shims required for the non-preloaded state or the none-preloaded condition of the differential case test assembly.

In FIG. 14 there is illustrated the dimension F. The dimension F is the shortest dimension between the bearing bore 220 and 222 and the inner surface of the cylindrical wall 216 of the pinion gear bearing bore 208. The dimention F is an accurate dimension and does not vary more than 0.000,5 inches. In other words, the maximum variation in the dimension F from one differential housing 200 to another differential housing 200 is 0.001 inches.

In the pinion gear 202 there is a variation in the depth of the gear teeth due to the manufacturer's tolerance. The variation will run from ± 0.006 inches. This is marked on the pinion gear 202 so that the party assembling the differential will have a reference dimension. Then, the proper thickness of the shims 214 can be used to approximately correct for the variation in the manufacture of the pinion gear 202. The dimension mark on the pinion gear 202 indicates whether the pinion gear will extend farther into the housing or not as far into the housing. The shims 214 are necessary to make corrections for this dimension to have the pinion gear 202 positioned properly in the differential housing 200.

Figure 20:
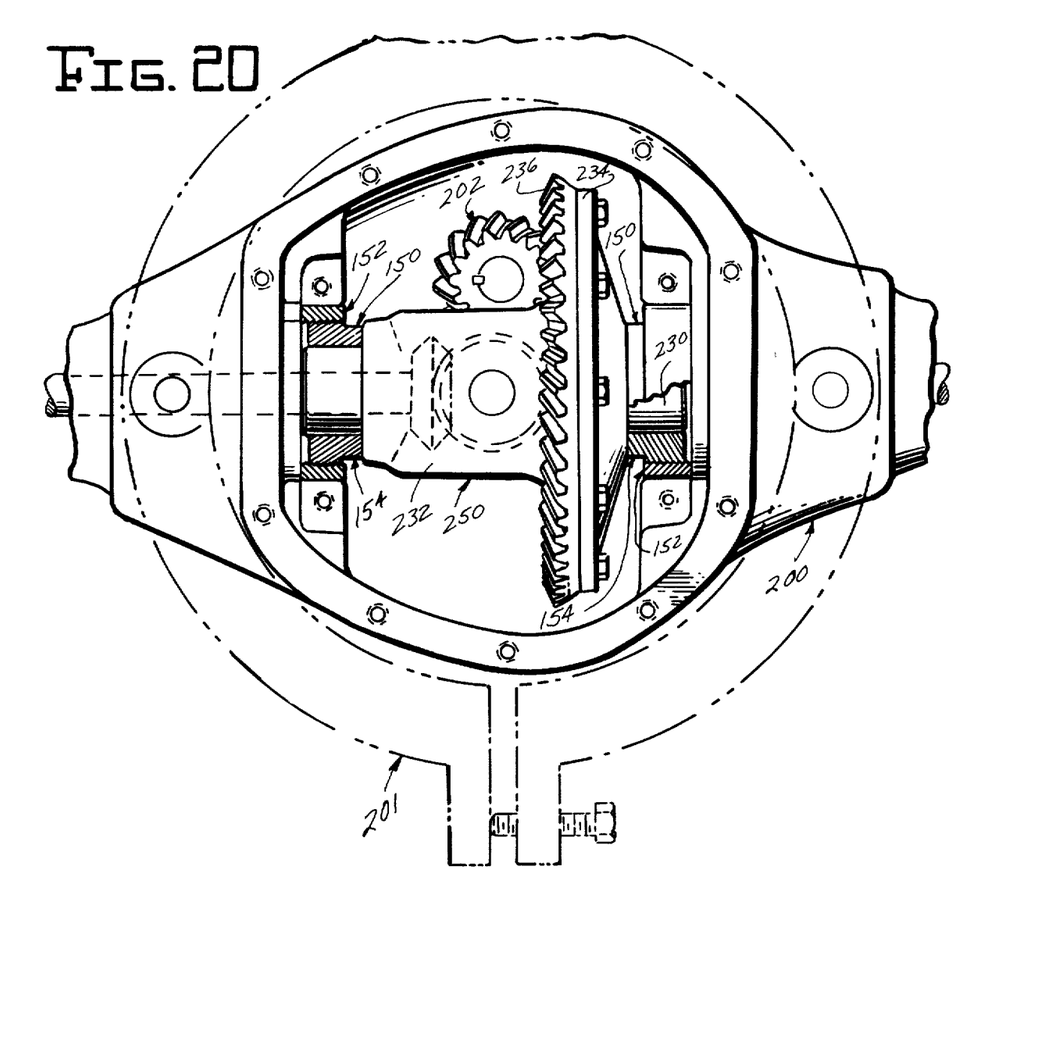

Again, with reference to FIG. 19, it is seen that there is a differential case test assembly 250 having a jig measuring tool 150 on a hub 228 and a jig measuring tool 150 on a hub 230. The thickness of the jig measuring tool 150, i.e., determined by the relative positions of the stationary member 152 and the movable member 154, determines, where the differential case test assembly is positioned in the differential housing 200, i.e., the relative position of the ring gear 236 with respect to the pinion gear 202. It is possible by adjusting thicknesses of the jig measuring tools 150 on the hubs 228 and 230 to obtain the specified backlash. More particularly, the differential case test assembly 250 is installed in the differentil case bearing bores 220 and 222 and in the differential housing 200. In this regard, see FIG. 20. The backlash between the ring gear 236 and the pinion gear 202 is checked to determine if there is specified backlash between these two gears. If the backlash is incorrect then the thickness of the jig measuring tools 150 on the hubs 228 and 230 is adjusted to secure the specified backlash. After the specified backlash is secured then the gear tooth contact between the pinion gear 202 and the ring gear 236 is checked to determine the correct depth of the pinion gear 202 in the housing 200 and with respect to the ring gear 236. The gear tooth contact pattern between the ring gear and the pinion gear is visually determined by painting red lead or white lead or other suitable visual indicator on the ring gear teeth and rotating the ring gear so as to have the ring gear teeth contact the teeth of the pinion gear. If necessary, the depth of the pinion gear in the housing is changed to have the correct gear tooth contact pattern between the pinion gear and the ring gear.

Then, the differential case test assembly 250 is removed from the differential housing 200. The jig measuring tools 150 are removed from the differential case test assembly 250. The thickness of a bearing 262 assembly with respect to the thickness of the jig measuring tool on the off-gear side is determined. This makes it possible to determine the thickness of shims necessary for the off-gear side of the differential case assembly, for a non-preloaded condition. Likewise, the thickness of a bearing assembly 264 with respect to the thickness of a jig measuring tool on the gear side of the differential case test assembly is determined. This makes it possible to determine the thickness of the shims required on the gear side of the differential case assembly, for a non-preloaded condition. Then, the differential case assembly is preloaded. The preload can vary from 0.006 inches to 0.008 inches of shims on each hub 228 and 230 of the differential case 200, but must be of equal thickness on both hubs. It is called to the attention of the reader that the thickness of the preload shims, approximately 0.006 inches to about 0.008 inches is in addition to the thickness of shims previously determined for the differential case 200. Then, the appropriate shims and bearing assembly are pressed onto the hubs 228 and 230 to form the preloaded differential case assembly.

Figure 17:
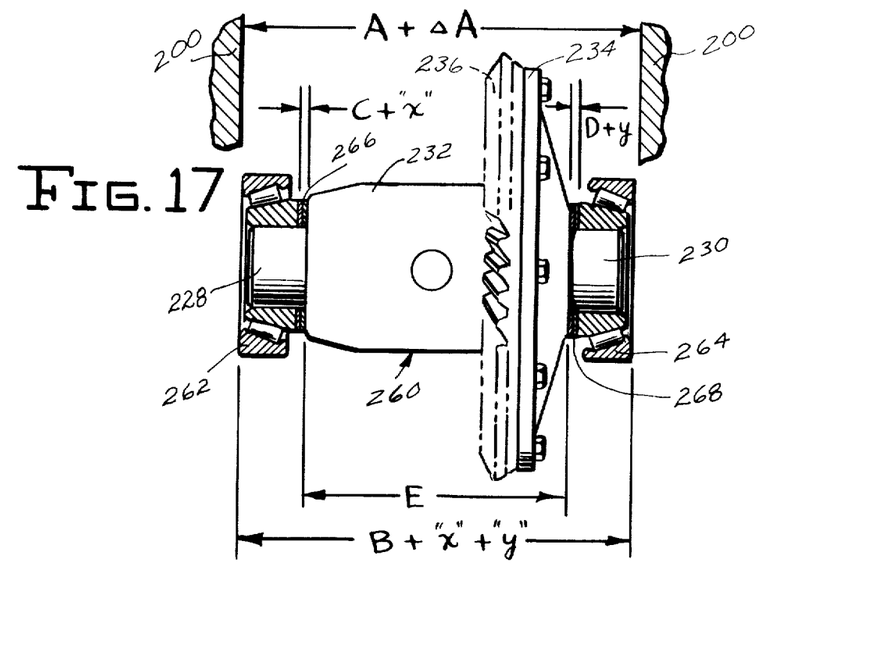
FIG. 17 is a view, partially in phantom and partially in cross-section, of a preloaded differential case assembly with ring gear, with bearings and with inboard shims, and illustrates in a fragmentary cross-sectional view, the differential housing spread so that the opening in the housing will accommodate the preloaded differential case assembly with bearings.

In FIG. 17 there is illustrated a preloaded differential case assembly 260 having bearing assembly 262 with appropriate shims 266 on the hub 228 and bearing assembly 264 with appropriate shims 268 on the hub 230.

As recalled A represents the normal opening in the differential housing 200. $A + \Delta A$ represents the normal opening in the differential housing 200 plus the spread of the opening in the housing, the spread of the opening being approximately 0.020 inches, so as to accommodate the preloaded differential case assembly 260.

Dimension C is the off-gear side shim dimension between the bearing assembly 262 and the differential case 232. The dimension X is the thickness of the shims for the preloaded conditions normally in the range of 0.006 inches to 0.008 inches. The dimension $C + X$ is the preloaded shim dimension between the bearing assembly 262 and the differential case 232.

The dimension D is the gear side dimension between the bearing assembly 264 and the differential case 232. The dimension Y is the thickness of shims for the preloaded condition normally, in the range of 0.006 inches to 0.008 inches. The dimesion $D + Y$ is the preloaded shim dimension for the gear side dimension between the bearing assembly 264 and the differential case 232.

As is recalled to the dimension X is equal to the dimension Y so that the thickness of the preload shims is the same on each side of the differential case assembly 260.

The dimension $B + X + Y$ is the preloaded overall length of the differential case assembly 260 with inboard shims 266 and 268 and the bearing assemblies 262 and 264 on the hubs 228 and 230.

Figure 18:
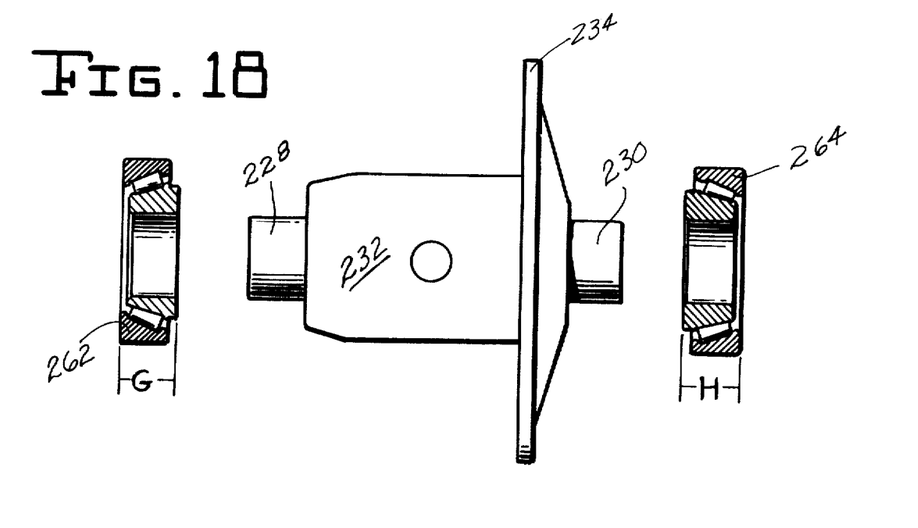
FIG. 18 is a view showing the differential case without the ring gear and with two bearing assemblies, without shims on the differential case, to illustrate the variable dimension in the width of the bearing assemblies of the differential case assembly.

It is necessary to determine the thickness of the bearing assembly 262 or 264 with respect to the thickness of the jig measuring tool 150. In the manufacture of the bearing assemblies 262 and 264, the thickness of the bearing assembly varies. This variation in the thickness of the bearing assemblies may be as much as plus or minus, 0.006 inches. In this regard, see FIG. 18, and bearing assemblies G and H. In almost all instances, the thickness of the bearing assembly G will be different than the thickness of the bearing assembly H. It is because of the variation in the thickness of the bearing assemblies and other manufacturing variations for the ring gear and the pinion gear, the differential housing and the differential case, that the jig measuring tools and the method for using such jig measuring tools have value. To repeat, with the prior methods of overhauling a differential using inboard shims, as well as outboard shims, bearing assemblies were pressed on to the hubs 228 and 230 on the differential case 232 to make the differential case assembly 260. The steps of determining the free basic dimension, the specified backlash and the correct gear tooth contact pattern necessitated, the forceful removal or pulling off of the bearing assemblies 262 and 264 from the hubs 228 and 230. With the forceful pulling off of the bearing assemblies 262 and 264 the shims were destroyed and could not be used again. Once in a while, the bearing assemblies 262 or 264 were so badly damaged or destroyed that the bearing assemblies had to be discarded. Then, it was necessary to use another bearing assembly. As the thickness of the bearing assemblies varied, this necessitated, once again, the determination of the free basic dimension and the correct gear tooth contact pattern between the ring gear and the pinion gear. From this, you can see that the shims were destroyed and bearing assemblies, possibly, damaged. As contrasted with this my jig measuring tools and methods for using the same make it possible to position the jig measuring tools on the hubs 228 and 230 by hand and without the use of a tool to force the jig measuring tools onto the hubs. Likewise, the jig measuring tools can be removed by hand and without a tool, from the hubs 228 and 230. Further, my method and jig measuring tools make it possible to more quickly remove the jig measuring tools from the hubs as mechanical means are not required.

With the use of my jig measuring tools 30 or 80 or 110 or 150 it is also possible to have the shims on the outside of the bearings 262 and 265. Place the shim 240, see FIG. 14, on the outside of the bearing 226. Remember, the basic dimensions have already been determined for the thickness of the shims required with the bearings 262 and 264. Then, the proper preload of approximately 0.006 to about 0.008 inches can be added to the thickness of the shims and the shims, 240, placed on the outside of the bearings 262 and 264. This makes it possible to have the proper thickness of shims for an outboard shim differential case assembly.

In the outboard shim method of assembling a differential case assembly, there is used only one shim instead of a shim pack, as in an inboard shim method in assembling a differential case assembly. For example, the thickness of shims in the differential case assembly having outboard shims varies as follows: the thickness of the shims varies from 0.060 inches to 0.095 inches in increments of 0.001 inches. Therefore, only one shim is placed in each differential housing bearing bore 220 and 222 between the bearing on the hub of the differential case assembly and the bearing bore. As contrasted with this, in an inboard shim method, the shims 266 and 268 are available in thickness of 0.003 inches, 0.005 inches, 0.010 inches and 0.030 inches. Generally, in the inboard shim method, there is used a multiplicity of shims 266 and 268. By various combinations of these shims in the inboard shim method the desired thickness of the shims is realized, including the desired preload thickness of shims.

With the foregoing presentation of the detailed description of the invention, I herewith claim the following:

1. A method for assembling a differential wherein said assembled differential comprises a housing, a pinion gear, pinion gear bearing assemblies, pinion gear depth shims, pinion gear bearing assembly adjusting shims, a ring gear, a differential case-assembly comprising a differential case and differential case bearing assemblies and differential case bearing assembly adjusting shims, said housing having pinion gear bores for positioning said pinion gear bearing assemblies and said housing having differential case bearing bores for positioning said differential case bearing assemblies, said method comprising:

a. positioning said differential case in said differential case bearing bores in said housing by means of said differential case in jig measuring tools with said jig measuring tools positioned on said differential case and with said jig measuring tools being substituted for differential case bearing assemblies and said jig measuring tools being in said differential case bearing bores with a first jig measuring tool being positioned in a first differential case bearing bore and a second jig measuring tool being positioned in a second differential case bearing bore; and, b. said differential case not having a ring gear mounted on the ring gear mounting flange;

c. adjusting said jig measuring tool to have a correct rotatable clearance between said jig measuring tool on said differential case and said first and second bearing bores so as to eliminate any measurable end play to make possible the checking of said ring gear mounting flange on said differential case for run out.

2. A method according to claim 1 and comprising:

a. mounting a ring gear on said ring gear mounting flange on said differential case.

b. positioning said differential case in said differential case bearing bores in said housing by means of said differential case in jig measuring tools with said jig measuring tools positioned on said differential case and with said jig measuring tools being substituted for differential case bearing assemblies and said jig measuring tools being in said differential case bearing bores with a first jig measuring tool being positioned in a first differential case bearing bore and a second jig measuring tool being positioned in a second differential case bearing bore; and, c. establishing the correct backlash of the ring gear with respect to the pinion gear by adjusting said first jig measuring tool and said second jig measuring tool to eliminate excess side motion of said differential case in said differential housing while maintaining rotatable clearance between said jig measuring tools and said differential case, and to make possible the checking of the run out of the ring gear.

3. A method according to claim 1 and comprising:

a. checking the gear tooth contact between the pinion gear and the ring gear to determine the correct depth of the pinion gear in the housing and with respect to the ring gear; and, b. if necessary, adjusting the depth of the pinion gear in the housing to have correct gear tooth contact between the pinion gear and the ring gear.

4. A method according to claim 3 and comprising:

a. removing the jig measuring tools from the differential case test assembly;

b. determining the thickness of each jig measuring tool;

c. determining the thickness of each differential case bearing assembly;

d. determining the thickness of shims on both the off-gear side and the gear side of the differential case to correct for the difference in the thickness dimension between the differential case bearing assembly and the corresponding jig measuring tool;

e. said off-gear side being that side of the differential case test assembly away from the differential case mounting flange for the ring gear of the differential case test assembly;

f. said gear side being that side of the differential case test assembly adjacent to the differential case mounting flange for the ring gear of the differential case test assembly;

g. positioning additional shims on the off-gear side and the gear side of the differential case to properly preload the differential case bearing assemblies; and, h. positioning said differential case bearing assemblies and shims on the differential case.

5. A method according to claim 4 and comprising:

a. in determining the difference in the thickness dimension between the differential case bearing assembly and the corresponding jig measuring tool placing the differential case bearing assembly and the jig measuring tool on a flat, even surface;

b. placing a flat, even plate on the jig measuring tool and determining a reference thickness for the combination of the jig measuring tool and the flat, even plate; and, c. placing said flat, even plate on the differential case bearing assembly and determining the variation of thickness of the combination of the differential case bearing assembly and the flat, even plate with respect to said reference thickness of the jig measuring tool and the flat, even plate.

6. A method according to claim 4 and comprising:

a. in the outboard shim method positioning said shims on the differential case between said differential case bearing assemblies and said differential case bearing bores.

7. A method according to claim 4 and comprising:

a. in the inboard shim method positioning said shims on the differential case between said differential case bearing assemblies and the differential case.

8. In a partial differential test assembly a combination comprising a. a housing;

b. said housing having first and second differential case bearing bores;

c. a differential case;

d. said differential case having a first hub and a second hub;

e. a first jig measuring tool on the first hub;

f. a second jig measuring tool on the second hub; and, g. said first jig measuring tool being in said first bearing bore and said second jig measuring tool being in said second bearing bore to determine the non-preloaded dimension between the differential case test assembly and said housing.

9. In a combination according to claim 8 and comprising:

a. tools on said differential case test assembly and in said first and second bearing bores said tools being adjusted, so as to have a correct rotatable clearance between said jig measuring tools and said first and second bearing bores to make possible the checking of the run out of the differential case ring gear mounting flange.

10. In a combination according to claim 8 and comprising:

a. a pinion gear in said housing;

b. a ring gear mounted on said differential case test assembly;

c. said jig measuring tools on said differential case test assembly said jig measuring tools being adjusted, for positioning the ring gear in correct relationship with the pinion gear to obtain correct backlash between the ring gear and the pinion gear and to make possible the checking of the run out of the ring gear and to make possible the checking of the gear tooth contact between the pinion gear and the ring gear for determining the correct depth of the pinion gear in the housing with respect to the ring gear.

* * * * *